US010156257B2

(12) United States Patent
Cornelius

(10) Patent No.: US 10,156,257 B2
(45) Date of Patent: Dec. 18, 2018

(54) LOW CLEARANCE HIGH CAPACITY ROLLER BEARING

(71) Applicant: CREATIVE MOTION CONTROL, INC., Redmond, WA (US)

(72) Inventor: Charles C. Cornelius, Coronado, CA (US)

( * ) Notice: Subject to any disclaimer, the term of this patent is extended or adjusted under 35 U.S.C. 154(b) by 0 days.

(21) Appl. No.: 15/523,620

(22) PCT Filed: Oct. 29, 2015

(86) PCT No.: PCT/US2015/058140
§ 371 (c)(1),
(2) Date: May 1, 2017

(87) PCT Pub. No.: WO2016/073286
PCT Pub. Date: May 12, 2016

(65) Prior Publication Data
US 2017/0307014 A1    Oct. 26, 2017

(51) Int. Cl.
F16C 33/34    (2006.01)
F16C 33/36    (2006.01)
F16C 19/36    (2006.01)
F16C 25/06    (2006.01)
F16C 33/58    (2006.01)
F16C 33/60    (2006.01)

(52) U.S. Cl.
CPC ............ F16C 33/363 (2013.01); F16C 19/36 (2013.01); F16C 25/06 (2013.01); F16C 33/585 (2013.01); F16C 33/60 (2013.01); F16C 2300/02 (2013.01)

(58) Field of Classification Search
CPC ........ F16C 19/36; F16C 33/36; F16C 33/363; F16C 33/60
See application file for complete search history.

(56) References Cited

U.S. PATENT DOCUMENTS

| 709,441 A | 9/1902 | Henderson |
| 4,040,689 A * | 8/1977 | Stanley ................. F16C 19/36 384/550 |
| 4,687,350 A | 8/1987 | Vogt et al. |
| 6,149,312 A | 11/2000 | Druet et al. |
| 2014/0301686 A1 * | 10/2014 | Cornelius ............... F16C 19/36 384/569 |

FOREIGN PATENT DOCUMENTS

CA    2355843 A1    8/2000

* cited by examiner

Primary Examiner — Phillip A Johnson
(74) Attorney, Agent, or Firm — Dean Craine

(57) ABSTRACT

A low clearance, high load capacity roller bearing that includes a cylindrical outer race with a set of non-helical grooves formed on its inside surface that mesh with teeth formed on the outside surface of a plurality of rotating rollers longitudinally and axially aligned inside the outer race. Located inside the rollers are two cylindrical inner race pieces each with non-helical outer grooves configured to mesh with the teeth on the rollers. The rollers are longitudinally aligned and evenly spaced apart inside the outer race and outside the inner race assembly by two retainer plates. The two inner race pieces are separated by a uniform circular gap in which a circular shim is disposed. Different lengths of inner race pieces may be used to create-different gap widths to reduce the clearance or to pre-load the bearing. Shims with different widths slightly larger or smaller than the gap are placed in the gap.

9 Claims, 6 Drawing Sheets

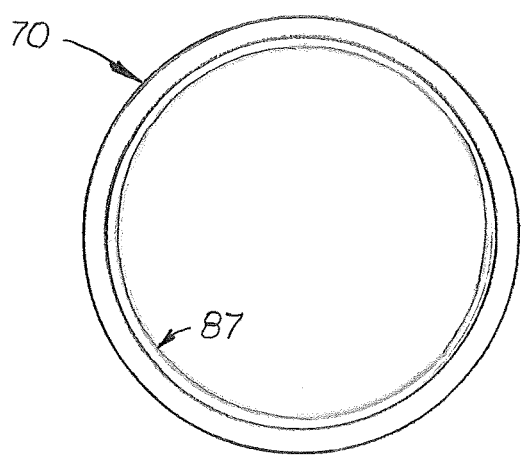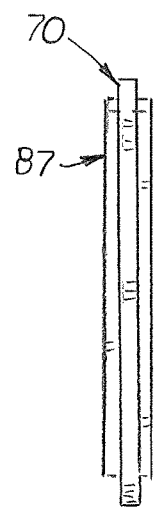
FIG. 9  FIG. 10
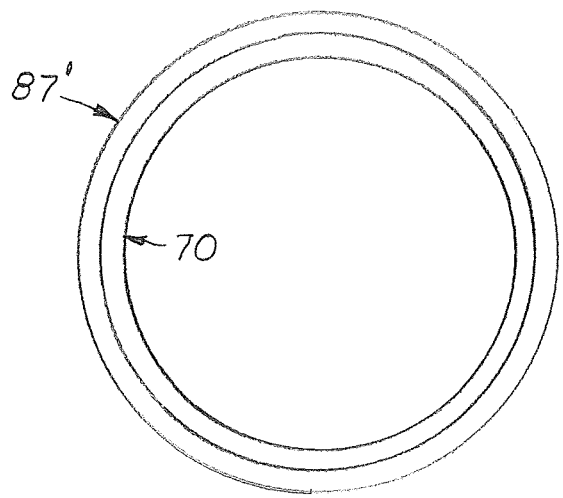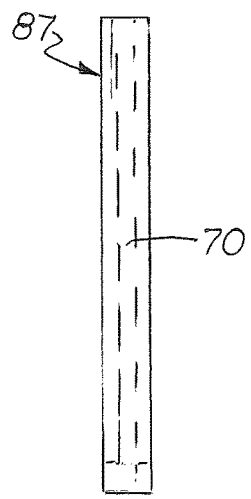
FIG. 11  FIG. 12

LOW CLEARANCE HIGH CAPACITY ROLLER BEARING

TECHNICAL FIELD

The present invention relates to grooved roller bearings and more particularly to groove roller bearings that can be preloaded or adjusted to have zero or reduced clearance.

BACKGROUND ART

High capacity roller bearings are used to transfer axial and/or radial loads created on a shaft to a heavy object or structure to support the object or structure in a direction parallel or abnormal to the longitudinal axis of the shaft. High capacity grooved roller bearings typically include an outer race the fits over a set of longitudinally aligned rollers disposed around an inner race. The outer race and the inner race include non-helical grooves that mesh with non-helical teeth formed on the rollers. A shaft extends through the inner race.

In most applications in which a load is applied to the shaft in one direction, the teeth on the rollers and the grooves on the inner races are manufactured with internal clearance so the flanks loaded on one side of the teeth on the rollers press against the mating flanks of the grooves. (see FIG. 1, Prior Art). In some applications, the load must be applied in opposite directions causing both flanks on the adjacent tooth and groove to be repeatedly and alternately pressed together. In most applications, some internal clearance is permitted which allows small internal, longitudinal movement. In some machinery, however, it is desirable to pre-load the roller bearing or further reduce the roller bearings' internal clearance.

What is needed is a roller bearing that can be pre-loaded or can be adjusted to reduce its internal clearance.

DISCLOSURE OF THE INVENTION

Disclosed herein is a low clearance, high load capacity roller bearing that includes a cylindrical outer race with a set of non-helical grooves formed on its inside surface that mesh and engage teeth formed on the outside surface of a plurality of rotating rollers longitudinally and axially aligned inside the outer race. Located inside the rollers are two longitudinally aligned, cylindrical inner race pieces. The two inner race pieces are coaxially aligned around an inner shaft. The inner race pieces have non-helical outer grooves formed on their outer surfaces that mesh with the teeth on the rollers disposed around the inner race pieces. When assembled, the rollers are longitudinally aligned and evenly spaced apart inside the outer race and outside the two inner race pieces. Two retainer plates at the opposite ends of the bearing are used to hold the inner race pieces inside the outer race.

The two inner race pieces are separated by a circular gap in which a ring-shaped shim is disposed. There are two embodiments disclosed which use different lengths of inner race pieces that form gap with different widths in which a shim mounted or formed on a shim ring is placed to force the two inner race pieces apart or to allow the two inner race pieces to be forced together. By moving the two inner race pieces longitudinally inside the rollers, the clearance of the bearing may be reduced, eliminated or the bearing may be preloaded.

In one embodiment, called the wide gap embodiment, the lengths of the inner race pieces are configured to create a gap approximately equal to or slightly greater than the pitch of the teeth on the rollers when the bearing is assembled. The gap is centrally aligned over the valley formed between two teeth formed on the roller. The inner pieces have lengths and grooves so the gap formed between them is aligned under a tooth. A wide shim slightly wider than the gap is placed into the gap to force the two inner race pieces apart a desired amount to reduce the bearing's clearance the desired amount. During use, the load is shared by the grooves on one inner race piece and on the mating teeth on the rollers. In this embodiment, the flank surfaces pressed against the teeth are aligned in opposite directions creating a pre-installed 'tight' bearing with reduced or no clearance. Sometimes the widths of the gap and shim are configured to preload the bearing.

In a second embodiment, the inner race pieces are configured to create a small gap between the two inner race pieces that is smaller than the pitch of the teeth on the roller. A narrow shim slightly smaller than the small gap is placed in the small gap which determines the final operating spacing of the two inner race pieces inside the bearing. The shim ring may be separately inserted into the center bore formed in the inner race pieces to hold the shim inside the gap. The shim may be integrally formed or mounted directly on the shim ring configured to fit into the center bore of the inner race pieces. When assembled, the small gap is located adjacent to the top land formed on the teeth on the rollers. Like the first embodiment, the load capacity is shared by the grooves on an inner race piece and on the mating teeth on the adjacent segment on the rollers.

Prior to installation, the inner race pieces are 'loose' inside the bearing. During installation, nuts, clamping structures or surfaces are installed on opposite ends of the inner race piece that force the internal ends of each inner race pieces inward against the shim to remove the clearances between the grooves and teeth. The flank surfaces pressed against the teeth are aligned in opposing directions. When the narrow gap second embodiment of the bearing is attached to a shaft, nuts, clamping structures or surfaces must force the two inner races pieces to the desired spacing as determined by the shim on pre-load the bearing the desired amount.

In both embodiments, the gap and shim are normally at or near the central axis between the two inner race pieces. In other embodiments, however the gap and shim may be offset from the central axis which may be desirable when higher load capacity is needed in one direction and lower load capacity is needed in the opposite direction.

In another embodiment, the roller includes large single inner race in place of two inner race pieces and the single outer race is replaced by two outer race pieces. Disposed around the outer race is a shim ring with an inward extending shim that fits into a gap formed between the two outer race pieces.

BRIEF DESCRIPTION OF THE DRAWINGS

FIG. 9 is front elevational view of a shim ring designed to side the inner race with an outward projecting shim formed or mounted on its outer surface.

FIG. 10 is a side elevational view of the shim ring shown in FIG. 9.

FIG. 11 is a front elevational view of a shim ring designed to fit around the outer race pieces used in place of a single outer race with an inward projecting shim formed or mounted on its inside surface.

FIG. 12 is a side elevational view of the shim ring shown in FIG. 11.

BEST MODE FOR CARRYING OUT THE INVENTION

Figure 1:
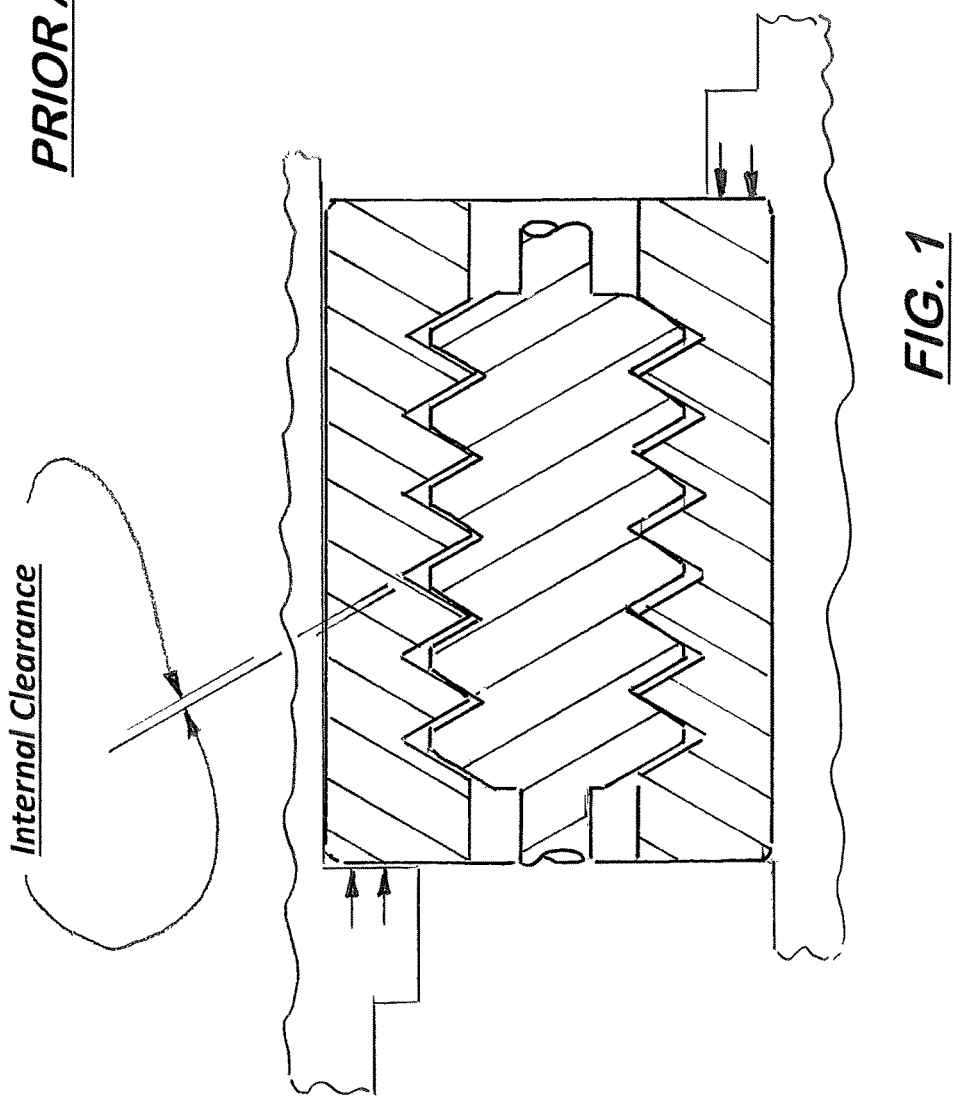
FIG. 1 is a sectional side elevational view of a roller bearing found in the prior art.

Disclosed herein is a low clearance, high load capacity roller bearing 20 that includes a cylindrical outer race 30 with a set of non-helical grooves 32 formed on its inside surface that mesh and engage teeth 82 formed on the outside surface of a plurality of parallel rotating rollers 80 longitudinally and axially aligned inside the outer race 30. Located inside the rollers 80 and coaxially aligned with the outer race 30 is an inner race assembly 40 comprising at least one pair of cylindrical inner race pieces 45, 50 each with non-helical outer grooves 47, 52, respectively, formed on their outer surfaces configured to mesh with the teeth 82 on the rollers 80 after assembly. The rollers 80 are longitudinally aligned and evenly spaced apart inside the outer race 30 and outside the inner race assembly 40 by two retainer plates 100, 110. Retaining rings 130, 132 that fit inside the end openings of the outer race 30 are used to hold the rollers 80 and inner race assembly 40, and the retainer plates 100, 110 inside the outer race 30.

The two inner race pieces 45, 50 are separated by a uniform circular gap 65, in which a wide or narrow ring-shaped shim 70 is disposed. When a shim 70 is disposed inside the gap 65, the two 45, 50 pieces are sufficiently axially forced apart to reduce or eliminate the clearance between the grooves 47, 52 on the inner race pieces 45, 50 and the teeth 82 on the rollers 80.

During assembly, the two inner race pieces 45, 50 are coaxially aligned over a shaft 200. Two ring-shaped shims 70 with the desired width are then placed into the gap between the two inner race spices 45, 50 to force the two inner race pieces 45, 50, longitudinally and axially outward in opposite directions.

Figure 2:
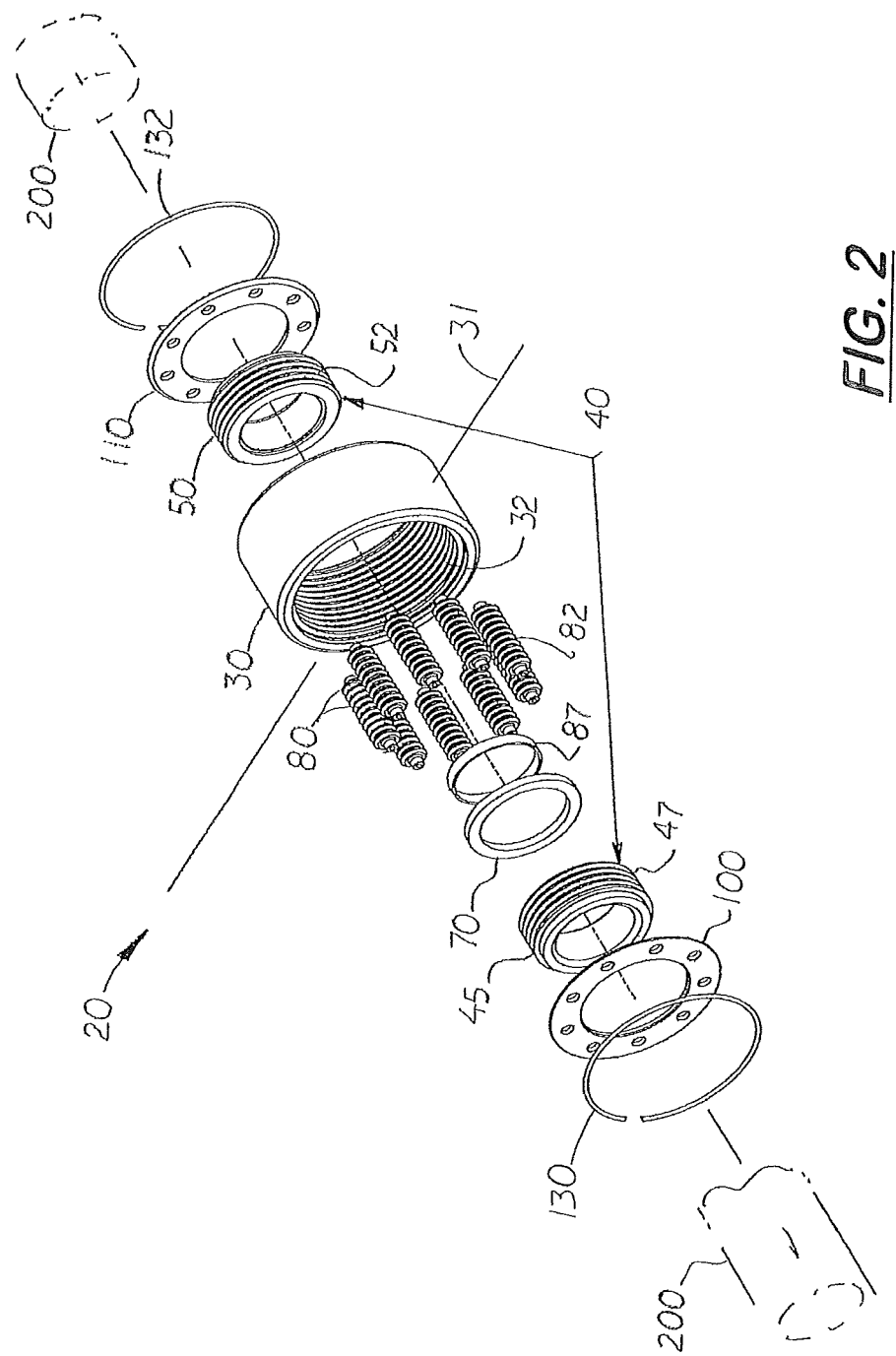
FIG. 2 is an exploded, perspective view of a low or zero clearance roller bearing disclosed herein.
Figure 3:
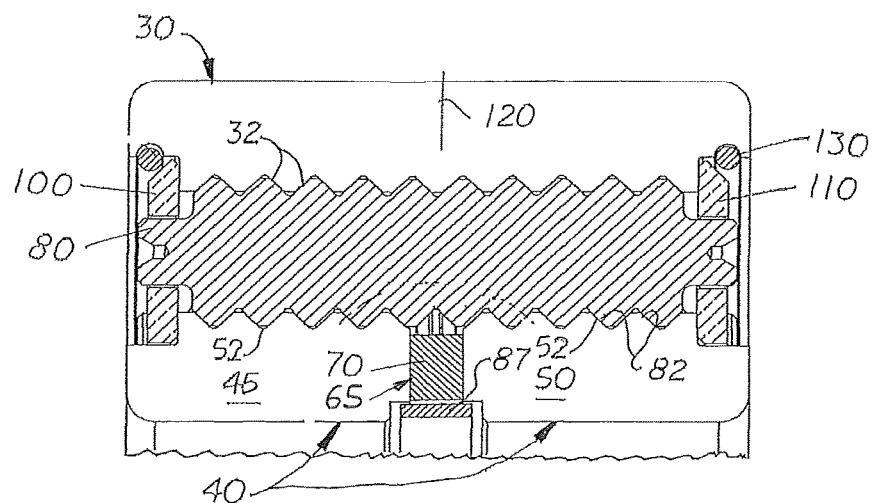
FIG. 3 is a sectional side elevational view of one embodiment of the roller bearing with a wide shim disposed between a first pair of two inner race pieces.
Figure 4:
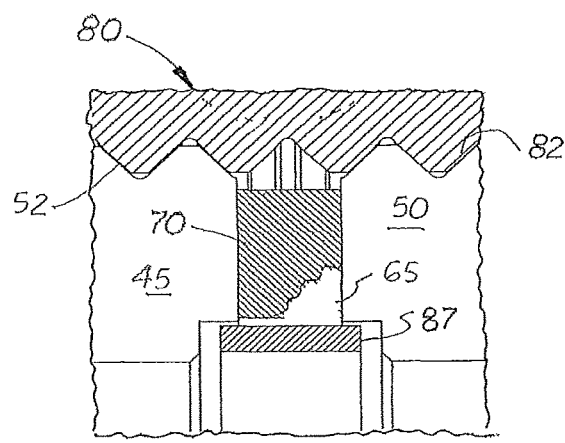
FIG. 4 is an enlarged, sectional, side elevational view of a two inner race pieces with a wide gap formed between them and a wide shim disposed in the gap.

In one embodiment, shown in FIGS. 2 and 3, a first pair of inner race pieces 45, 50 are selected to form the desired gap 65 needed to preload or reduce clearance between the roller's teeth 82 and the inner race pieces grooves 67. The gap 65 is centrally aligned over the valley formed between two teeth 82 on the roller 80. A wide shim 70 is then selected to fill the gap 65. An optional ring-shaped, retaining shim ring 87 may be used hold the shim 70 in place. In another embodiment, the gap 65 is approximately equal to or slightly greater than the pitch of the teeth 82 on the roller 80. The wide shim 70 may have a width slightly greater than or slightly smaller than the gap 65 depending on the clearance desired.

FIG. 3 shows a gap 65 with a shim 70 slightly wider than the gap 65. The wide shim 70 forces one half of the outer facing flank surfaces on grooves 47, 52, on the two inner race pieces 45, 50, respectively, against the inner facing flank surfaces on the teeth 82 of the sections of rollers 80 adjacent to the inner race pieces 45, 50. During use, the load capacity of the roller bearing 20 is shared by one-half the grooves 47, 52, and the teeth 82. On this embodiment, the one half flank surfaces on the grooves pressed against the flank surfaces on the teeth in opposite directions creating a pre-installed 'tight' bearing with reduced or no clearance. Sometimes the widths of the gap 65 and shim 70 are configured to preload the bearing.

In the embodiment, the shim 70 may have a width less than the width of the gap 65 enabling the one-half flanks on the opposite side of the groove 47 or 52 to press against the opposite flank surfaces on the teeth 82. Nuts, clamping structures, or surfaces may be used press the inner race pieces 45, 50 inward to pre-load the bearing the desired amount.

Figure 5:
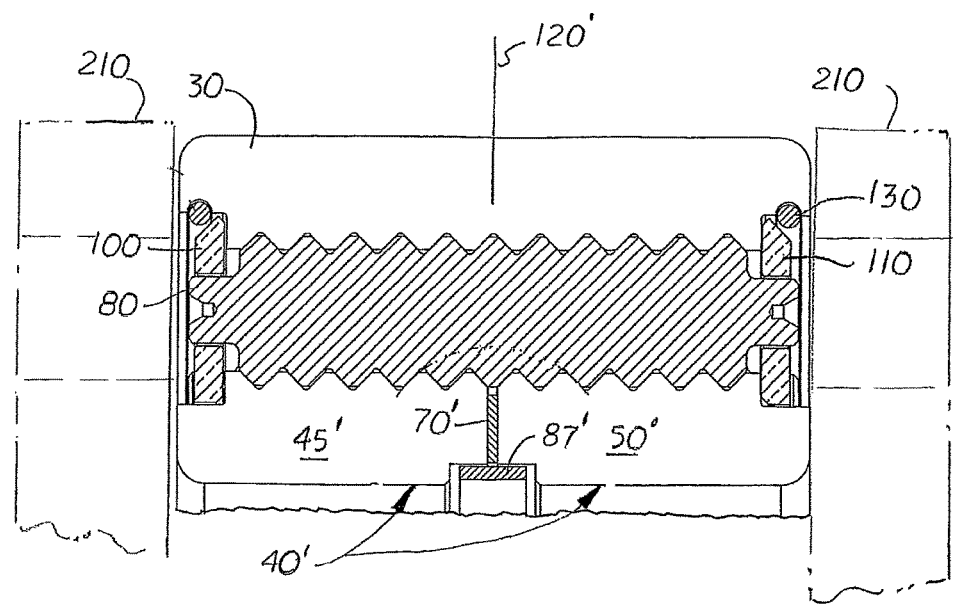
FIG. 5 is a sectional side elevational view of a second embodiment of the roller bearing with a narrow shim disposed between a second pair of two inner race pieces.
Figure 6:
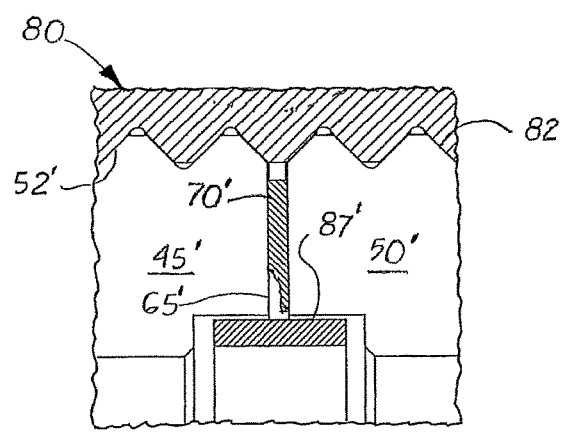
FIG. 6 is an enlarged, sectional, side elevational view of the second pair of inner race pieces with a narrow gap formed between them and a narrow shim.

In a second embodiment, shown in FIGS. 5 and 6, a second pair of inner race pieces 45', 50' are assembled inside the outer race 30 that form a smaller gap 65' between the two inner race pieces 45', 50'. A narrow shim 70' slightly smaller or slightly larger than the small gap 65' may be placed in the small gap 65' which axially moves the two inner race pieces 45', 50' inside the bearing. When assembled, the small gap 65' is located adjacent to the top land formed between the teeth 82 on the rollers 80.

In this embodiment, nuts 210 or clamping surfaces or structures are used to press the two inner sleeve pieces 45', 50' inward on the shaft (not shown). When assembled, the opposite facing flanks on the grooves 47', 52' on the two inner sleeve pieces 45', 50' respectively, press against both facing flanks on the teeth 82 on the roller 80. In the second embodiment, the load capacity is shared by all the grooves 47', 52' on one inner race piece 45' or, 50' respectively, and the adjacent mating teeth 82 on the rollers share the load capacity.

In both embodiments presented, the gaps 65, 65' and shims 70, 70' are at or near the midline central axis 31 of the outer race 30 and the midline central axis 120, 120', respectively, between the pair of two inner race pieces 45, 50 and 45', 50'. It should be understood, however, that the gap 65, 65' and shims 70, 70' may be offset from the central axis 120, 120' to provide higher load capacity in one direction on one end of the roller bearing and lower load capacity in the opposite direction.

Figure 7:
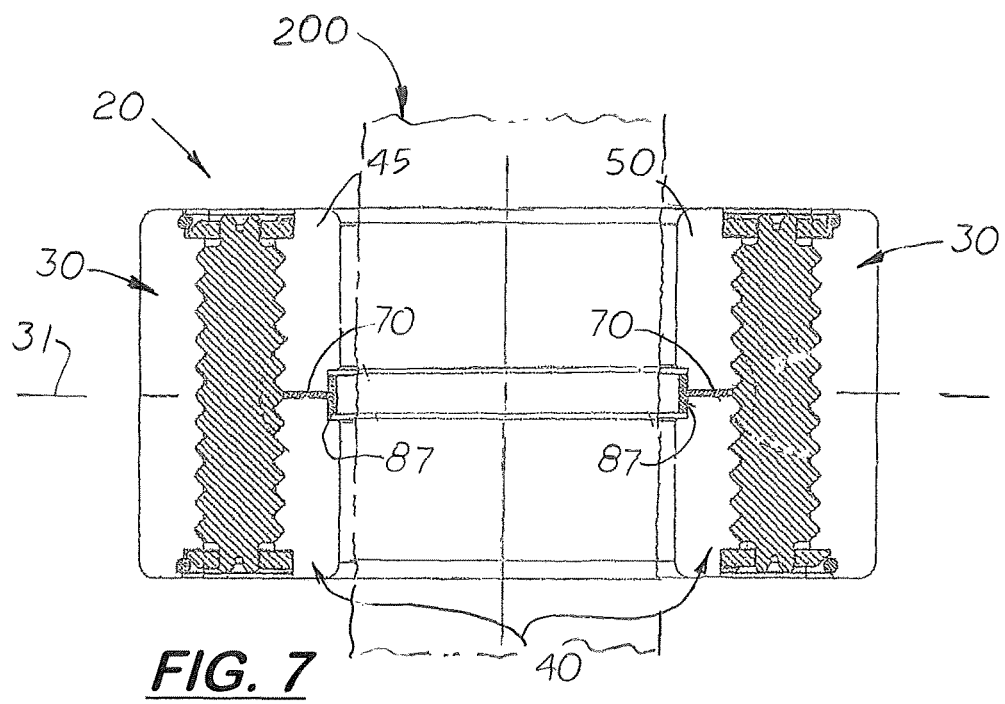
FIG. 7 is a sectional side elevational view of the roller bearing that includes a centrally aligned circular shim ring with an outward projecting shim on its outer surface inserted into the gap formed between the two inner race pieces.

FIG. 7 is a sectional side elevational view of the roller bearing that includes a centrally aligned circular shim ring 87 with an outward projecting shim 70 on its outer surface inserted into the gap formed between the two inner race pieces 45, 50.

Figure 8:
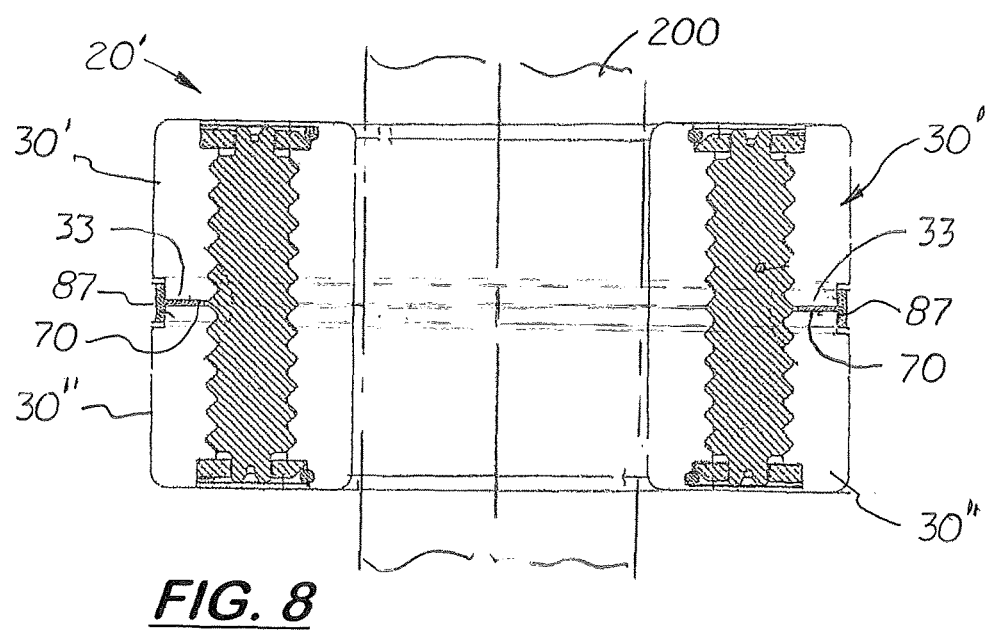
FIG. 8 is a sectional side elevational view of another embodiment of the roller bearing in which single outer race is replaced with two outer race pieces with a gap formed between them and a circular shim ring that fits around the outer race with an inward projecting shim on its inside surface that fits into the gap formed between the two outer race pieces forcing them apart.

FIG. 8 is a sectional side elevational view of another embodiment of the roller bearing 20' in which single outer race 30 is replaced with two outer race pieces 30', 30" with a gap 33 formed between them and a circular shim ring 87 that fits around the outer race pieces 30', 30" with an inward projecting shim 70 on its inside surface that fits into the gap 33 forcing the two outer race pieces 30', 30" them apart.

In compliance with the statute, the invention described has been described in language more or less specific on structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted under the doctrine of equivalents.

INDUSTRIAL APPLICABILITY

This invention may be used in industries that use threaded connectors to connect components together. More particularly, this invention will used in industries that use threaded connectors that undergo high torque forces.

The invention claimed is:

1. A roller bearing, comprising;
   a. a hollow, cylindrical outer race with a midline axis and inward facing, non-helical grooves;
   b. a plurality of rollers axially aligned inside said outer race, said rollers being axially aligned and evenly spaced apart from said midline axis of said outer race, each said roller includes a plurality of non-helical teeth configured to mesh with said grooves on said outer race;
   c. two inner race pieces axially aligned with said outer race and inward from said rollers, each said race piece includes a plurality of grooves configured to mesh with said teeth on said rollers, said race pieces being separated by a gap with a desired width to allow said inner race pieces to move longitudinally together or apart to adjust the clearance between said grooves on said inner race pieces and said teeth on said rollers when assembled, each said inner race pieces includes a shaft bore, and;
   d. a shim disposed inside said gap between said inner race pieces, said shim having a width configured to force said inner race pieces longitudinally apart and against said rollers to reduce the clearance or pre-load said roller bearing or to move said inner race pieces axially to allow a pre-load force to be applied to said roller bearing after placement on a shaft.

2. The roller bearing as recited in claim 1, further including two retainer plates used to hold said inner race pieces inside said outer race.

3. The roller bearing as recited in claim 2, further including a retaining ring that engages said outer race to hold each said retainer plate inside said outer race.

4. The roller bearing as recited in claim 1, further including a shim ring configured to hold said shim inside said gap.

5. The roller bearing as recited in claim 1, further including two nuts on the opposite ends of said outer race, said nuts configured to attach to a threaded shaft that extends into said roller bearing and apply opposite inward forces to said outer nut.

6. A roller bearing configured to be mounted on a shaft, comprising;
   a. a hollow, cylindrical outer race with a midline axis and inward facing, non-helical grooves;
   b. a plurality of rollers axially aligned inside said outer race, said rollers being axially aligned and evenly spaced apart from said midline axis of said outer race, each said roller includes a plurality of non-helical teeth configured to mesh with said grooves on said outer race;
   c. two inner race pieces axially aligned with said outer race and inward from said rollers, each said race piece includes a plurality of grooves configured to mesh with said teeth on said rollers, said race pieces being separated by a gap with a desired width to allow said inner race pieces to move longitudinally together or apart to adjust the clearance between said grooves on said inner race pieces and said teeth on said rollers when assembled, each said inner race pieces includes a shaft bore;
   d. a shim disposed inside said gap between said inner race pieces, said shim having a width configured to allow said inner race pieces to move.

7. The roller bearing as recited in claim 6, further including two retainer plates used to hold said inner race pieces inside said outer race.

8. The roller bearing as recited in claim 6, further including a retaining ring that engages said outer race to hold each said retainer plate inside said outer race.

9. The roller bearing as recited in claim 6, further including a shim ring configured to hold said shim inside said gap.

* * * * *